(12) United States Patent
Naerheim

(10) Patent No.: US 6,170,921 B1
(45) Date of Patent: Jan. 9, 2001

(54) MAGNETOSTRICTIVE BRAKE ACTUATION MECHANISM

(75) Inventor: Yngve Naerheim, Thousand Oaks, CA (US)

(73) Assignee: Meritor Heavy Vehicle Systems, LLC, Troy, MI (US)

(*) Notice: Under 35 U.S.C. 154(b), the term of this patent shall be extended for 0 days.

(21) Appl. No.: 09/234,578

(22) Filed: Jan. 21, 1999

(51) Int. Cl.[7] .................... F16D 65/18; F16D 65/21; F16D 55/08; H01L 41/06; H01L 41/12
(52) U.S. Cl. ................. 303/10; 188/72.1; 303/113.1; 303/DIG. 11; 303/3; 303/155
(58) Field of Search ............... 303/DIG. 3, DIG. 4, 303/166, 167, 20, 116.4, 3, 113.1, 15, 115.1–115.6, 7, 155, 10–12, 116; 188/156–165, 72.1, 72.4, 370; 335/215; 310/26; 417/322, 410.1, 410.3, 410.4, 411, 505; 60/545, 400; 367/156, 168; 318/118

(56) References Cited

U.S. PATENT DOCUMENTS

| | | | |
|---|---|---|---|
| 4,334,602 | * | 6/1982 | Armour et al. |
| 4,629,039 | * | 12/1986 | Imoto et al. ............... 188/72.1 |
| 4,679,668 | | 7/1987 | Washizu et al. ............ 188/353 |
| 4,705,323 | * | 11/1987 | Imoto et al. ............... 188/72.1 |
| 4,726,741 | * | 2/1988 | Cusack ..................... 417/322 |
| 4,765,140 | * | 8/1988 | Imoto et al. ................ 60/545 |
| 4,815,946 | * | 3/1989 | Cusack ..................... 417/322 |
| 4,880,282 | | 11/1989 | Makino et al. .............. 303/116 |
| 5,163,659 | * | 11/1992 | Lizell . |
| 5,246,283 | | 9/1993 | Shaw et al. ................. 303/115 |
| 5,267,479 | * | 12/1993 | Arvidsson . |
| 5,377,802 | * | 1/1995 | Ide . |
| 5,378,120 | * | 1/1995 | Taig ........................ 417/322 |
| 5,553,828 | * | 9/1996 | Jaenker . |
| 5,597,292 | * | 1/1997 | Rhee et al. ................. 417/322 |
| 5,630,709 | * | 5/1997 | Bar-Cohen ................. 417/322 |
| 5,749,633 | | 5/1998 | Baumgartner ............... 303/113 |
| 5,791,745 | | 8/1998 | Sakakibara ................. 303/11 |
| 5,826,683 | * | 10/1998 | Murata et al. .............. 188/72.1 |
| 5,992,296 | * | 11/1999 | Murata . |

FOREIGN PATENT DOCUMENTS

| | | | |
|---|---|---|---|
| 4032555 | * | 4/1992 | (DE) . |
| 195 08 253 | * | 9/1996 | (DE) . |
| 9137842 | * | 5/1997 | (JP) . |
| 9303448 | * | 11/1997 | (JP) . |
| 9303449 | * | 11/1997 | (JP) . |
| 9303451 | * | 11/1997 | (JP) . |
| 10196519 | * | 7/1998 | (JP) . |
| 1193830 | * | 4/1999 | (JP) . |
| 11324931 | * | 11/1999 | (JP) . |

* cited by examiner

Primary Examiner—Douglas C. Butler
(74) Attorney, Agent, or Firm—Carlson, Gaskey & Olds

(57) ABSTRACT

An actuation system includes a magnetostrictive pump assembly to operate a fluid ram such as a brake cylinder connected to an actuator such as a brake. A first accumulator is connected to an input of the fluid ram to store a fluid which actuates the fluid ram. A second accumulator is similarly connected to an output of the fluid ram to receive the used fluid after actuation of the fluid ram. The magnetostrictive pump assembly is connected between the first accumulator and second accumulator, to transfer the fluid from the second accumulator to the first accumulator such that the fluid is maintained at a high pressure for activation of the fluid ram. As the magnetostrictive pump assembly reacts essentially instantaneously, any delay between actuation or deactivation is practically eliminated. Further, although the displacement of the pump is relatively small, it can be cycled at extremely high frequencies to provide substantial pumping capacity for immediate brake activation.

8 Claims, 1 Drawing Sheet

MAGNETOSTRICTIVE BRAKE ACTUATION MECHANISM

BACKGROUND OF THE INVENTION

The present invention relate generally to braking systems for use in motor vehicles, and more particularly to the use of a magnetostrictive pump assembly for such a braking system.

Generally, conventional braking systems include an accumulator for accumulating hydraulic pressure to be used for the braking operation of the vehicle and further have an apparatus of controlling the hydraulic pressure of the accumulator. The hydraulic pressure in the accumulator is typically controlled by an electric motor-driven pump associated with a pressure sensor which senses the accumulator pressure. The outlet of the pump is connected to the accumulator. The motor-driven pump draws brake fluid from a reservoir and pumps the brake fluid to the accumulator to increase the fluid pressure in the accumulator.

The accumulator pressure control apparatus is operated such that the motor-driven pump is operated in response to the accumulator pressure falling below a predetermined lower limit and deenergized when the accumulator pressure reaches a predetermined upper limit. One problem with such an accumulator pressure control apparatus is that it is difficult to accurately keep the accumulator pressure in a predetermined range due to the delay between actuation and deactivation of the motor and the resulting output from the pump.

Further, such a delay in the pump operation method causes difficulty to quickly stop the pump at the time of termination of the braking operation. This disadvantage is particularly magnified when a slip control or anti-lock brake system is applied to each wheel and integrated with the brake system, as the non-simultaneous actuation of a brake at each wheel increases the delay in stopping the motor and results in generation of noises and vibration due to continued pump operation.

SUMMARY OF THE INVENTION

The present invention overcomes the disadvantages described above by providing an actuation system powered by a magnetostrictive pump assembly. The pumping action of the magnetostrictive pump assembly is provided by the linear expansion and contraction of a magnetostrictive material in response to an external magnetic field. The magnetostrictive material reacts in a dimensionally predictable, repeatable manner to the magnetic changes. Additionally, as the magnetostrictive material reacts essentially instantaneously, any delay between actuation or deactivation is practically eliminated. Further, although the displacement of the pump is relatively small, it can be cycled at extremely high frequencies to provide substantial pumping capacity. Also, because of the relatively small displacement, the magnetostrictive pump effectively has no moving parts.

The present invention generally employs the magnetostrictive pump assembly to operate a fluid ram such as a brake cylinder connected to an actuator such as a brake. A first accumulator is connected to an input of the fluid ram to store a fluid which actuates the fluid ram. A second accumulator is similarly connected to an output of the fluid ram to receive the used fluid after actuation of the fluid ram. The magnetostrictive pump assembly is connected between the first accumulator and second accumulator, to transfer the fluid from the second accumulator to the first accumulator such that the fluid is maintained at a high pressure for activation of the fluid ram.

In use with a braking system, the magnetostrictive pump assembly and fluid ram can be integrated within a brake caliper. The magnetostrictive pump assembly can be selectively operated by an electric signal to pressurize the fluid and actuate the fluid ram. The fluid ram applies a force to a brake rotor connected to a wheel of a vehicle for applying a braking force to the wheel. Rapid operation of the magnetostrictive pump assures that fluid ram is immediately available for activation of the brake.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
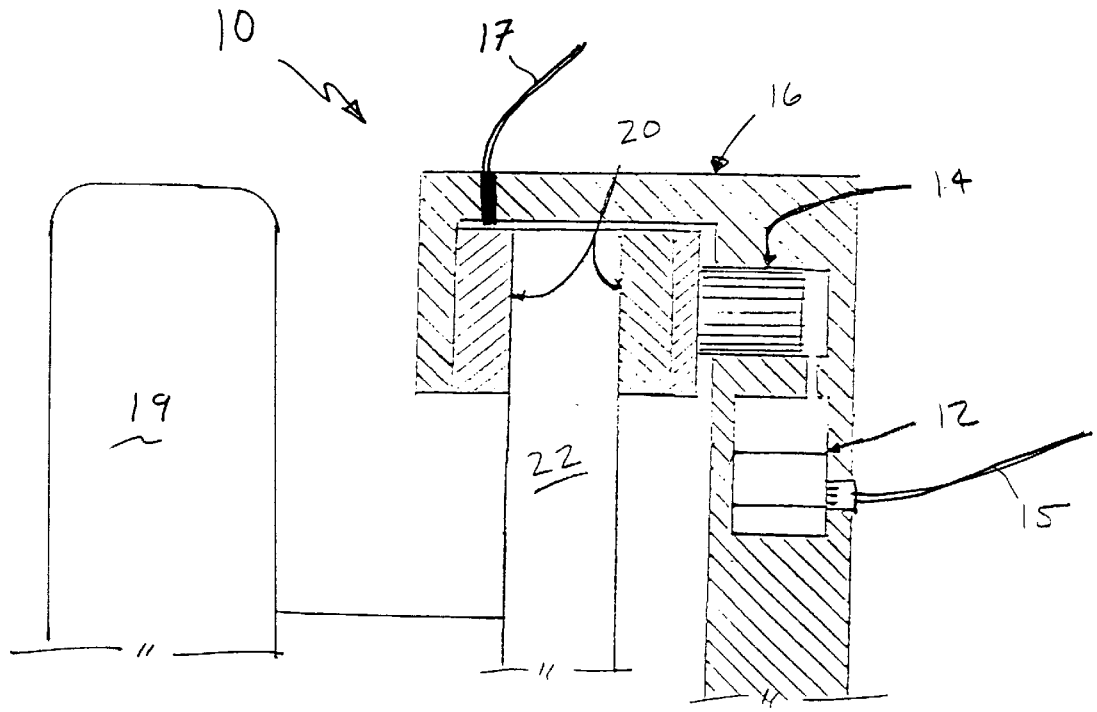
FIG. 1 is sectional view of a brake assembly according to the present invention.

FIG. 1 illustrates a brake assembly 10 according to the present invention. As will be further described below, the present invention generally includes a magnetostrictive pump assembly 12 to operate a fluid ram 14 such as a brake cylinder.

The pumping action of the magnetostrictive pump assembly 12 is provided by the linear expansion and contraction of a magnetostrictive material in response to an external magnetic field. The magnetostrictive material reacts in a dimensionally predictable, repeatable manner to the magnetic changes. Further, as the magnetostrictive material is activated by an electromagnetic field, the magnetostrictive pump assembly 12 can be located in areas of limited accessibility and activated by an electric wire (shown schematically at 15).

As illustrated in FIG. 1, the magnetostrictive pump assembly 12 and fluid ram 14 can be housed directly in a brake caliper 16 to provide each wheel (shown somewhat schematically at 19) to have an independently electrically activated brake assembly 10. Accordingly, although only one is shown, a plurality of magnetostrictive pump assemblies 12 and fluid ram 14 can provide the required clamping force along an actuator such as a brake pad 20 to apply an effective braking force to a brake rotor 22. The number and size of magnetostrictive pump assemblies 12 are dependent on the required braking scenarios and vehicle size. Additionally, by incorporating a sensor (shown schematically at 17) near the brake pad 20, the wear rate at between each brake can be balanced. Preferably, the sensor is a temperature sensor element within the caliper 16.

Figure 2:
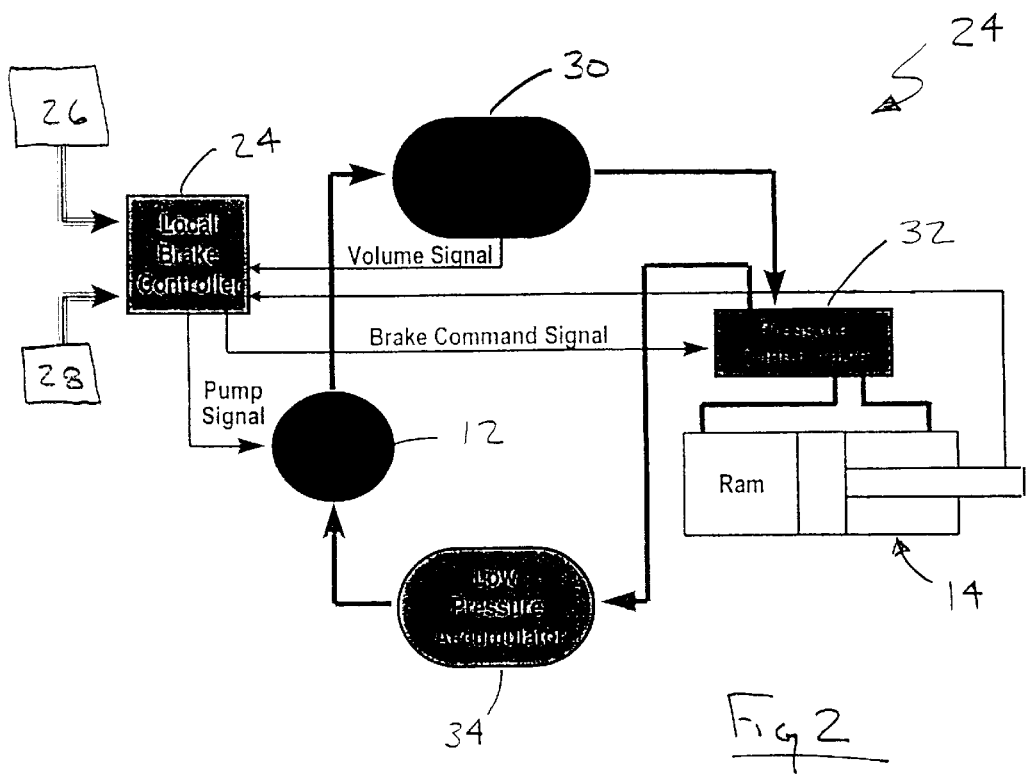
FIG. 2 is a block diagram of a brake system according to the present invention.

FIG. 2 illustrates a block diagram of a brake system 24 according to the present invention. As the magnetostrictive material reacts essentially instantaneously, any delay between actuation or deactivation is practically eliminated. Further, although the displacement of the pump 12 may be relatively small, it can be cycled at extremely high frequencies to provide substantial pumping capacity. This makes "brake-by-wire" at each wheel 19 (FIG. 1) practical and further allows the direct integration of anti-slip and anti-lock braking system (ABS) by an appropriate local controller 24.

The local controller 24 is preferably connected to a vehicle power system 26 and information system 28 such as an on-board computer. The local controller 24 communicates with a first accumulator 30 to determine and maintain the current pressure of an actuation fluid such as brake fluid within the first accumulator 30. The first accumulator 30 is preferably a high pressure accumulator connected to an input of the fluid ram 14 through a valve 32. A second accumulator 34, preferably a low pressure accumulator is similarly connected to an output of the fluid ram 14 through the valve 14. The second accumulator 34 receives the used, low pressure fluid after actuation of the fluid ram 14.

The magnetostrictive pump assembly 12 is connected between the first accumulator 30 and the second accumulator 34, to replenish the first accumulator 30 from the second accumulator 34 such that the fluid is continually maintained at a high pressure for immediate activation of the fluid ram 14. As the magnetostrictive pump assembly 12 reacts essentially instantaneously, any delay between actuation or deactivation is practically eliminated and it can be cycled at extremely high frequencies to provide substantial pumping capacity. Although a single pump assembly 12 is shown, one skilled in the art will realize that a plurality pumps in series or parallel can be provided which are specifically tailored to provide the required pumping capacity.

In use, a brake command signal from an operator brake pedal or automatic system such as anti-slip or ABS is sent from the controller 24 to actuate the valve 32. The valve 32 allows a high pressure fluid from the first accumulator 30 to actuate the fluid ram 14. The fluid ram 14 can thus apply a force to a brake rotor (FIG. 1) connected to a wheel 18 of a vehicle for immediately applying a braking force to the wheel 19. The controller recognizes that the fluid is being depleted from the first accumulator 30 and activates the magnetostrictive pump assembly 12 to replenish and increase the pressure within the first accumulator 30 from the second accumulator 34. The immediate, rapid actuation of the magnetostrictive pump assembly 12 assures that fluid is continuously available within the first accumulator 30 for activation of the brake (FIG. 1). As the second accumulator 34 receives the used, low pressure fluid after actuation of the fluid ram 14, fluid is continuously cycled through the brake system 24 by the magnetostrictive pump assembly 12.

The foregoing description is to be exemplary rather than defined by any limitations within. Obviously, many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A brake system, comprising:
    a brake cylinder operatively connected to a brake attached to a wheel of a vehicle for applying a braking force to the wheel;
    a first accumulator operably connected to an input of said brake cylinder, said first accumulator for storing a fluid to actuate said brake cylinder;
    a second accumulator operably connected to an output of said brake cylinder, said second accumulator receiving said fluid from said brake cylinder;
    a magnetostrictive pump connected to said first accumulator and said second accumulator, said pump actuatable to transfer said fluid from said second accumulator to said first accumulator;
    a valve for selective communication between said first accumulator and said brake cylinder; and
    a local brake controller to actuate said pump assembly such that said pump assembly substantially maintains said fluid in said first accumulator at a predefined pressure, and to control said valve such that said fluid from said first accumulator is available to actuate said brake cylinder.

2. The brake system as recited in claim 1, further comprising a temperature sensor attached adjacent said brake, said temperature sensor in communication with said local brake controller.

3. The brake system as recited in claim 1, further comprising a wear sensor attached adjacent said brake, said temperature sensor in communication with said local brake controller.

4. The brake system as recited in claim 1, wherein said magnetostrictive pump is contained within a caliper of said brake system.

5. The system as recited in claim 1, wherein said magnetostrictive pump and said fluid ram are contained within a caliper of said brake assembly, said fluid ram applying a force to a brake rotor connected to said wheel for applying a braking force to said wheel.

6. A method of actuating a fluid ram to operate a brake system for a vehicle comprising the steps of:
    (1) maintaining a fluid in a second accumulator at a low pressure;
    (2) pumping said fluid from said second accumulator to a first accumulator by a magnetostrictive pump, said magnetostrictive pump operable to increase the pressure of said fluid in said first accumulator;
    (3) releasing said fluid from said first accumulator to actuate said fluid ram and operate a brake system; and
    (4) returning said fluid from said fluid ram to said second accumulator.

7. A method as recited in claim 6, further comprising the step of maintaining said fluid in said first accumulator at a predefined pressure for operating said brake system.

8. A brake system, comprising:
    a brake assembly including a caliper located adjacent a brake rotor connected to a wheel of a vehicle;
    a fluid ram located substantially within said brake caliper for applying a braking force to said brake rotor;
    a first accumulator in communication with an input of said fluid ram, said first accumulator for storing a fluid to actuate said fluid ram;
    a second accumulator in communication with an output of said fluid ram, said second accumulator receiving said fluid from said fluid ram;
    a magnetostrictive pump located substantially within said brake caliper, said pump connected to said first accumulator and said second accumulator, said pump actuatable to transfer said fluid from said second accumulator to said first accumulator and to increase a fluid pressure of said fluid in said first accumulator to a predefined pressure;
    a valve for selective communication between said first accumulator and said brake cylinder; and
    a local brake controller to actuate said pump assembly such that said pump assembly substantially maintains said fluid in said first accumulator at a predefined pressure, and to control said valve such that said fluid from said first accumulator is available to actuate said fluid ram.

\* \* \* \* \*